E. BUNZEL.
FLOWER POT HOLDER AND CARRIER.
APPLICATION FILED NOV. 30, 1917.

1,280,387.

Patented Oct. 1, 1918.

Ernest Bunzel Inventor

By his Attorney

UNITED STATES PATENT OFFICE.

ERNEST BUNZEL, OF PLYMOUTH MEETING, PENNSYLVANIA.

FLOWER-POT HOLDER AND CARRIER.

1,280,387.             Specification of Letters Patent.        Patented Oct. 1, 1918.

Application filed November 30, 1917. Serial No. 204,761.

*To all whom it may concern:*

Be it known that I, ERNEST BUNZEL, a citizen of the United States, residing at Plymouth Meeting, in the county of Montgomery and State of Pennsylvania, have invented new and useful Improvements in Flower-Pot Holders and Carriers, of which the following is a specification.

My invention relates to new and useful improvements in flower pot holders and carriers, and has for its object to provide an exceedingly simple and inexpensive device of this character which may be used as a hanging basket or a stand for the flower pot and when desired may be used to transport potted plants from one place to another without injury to the plant and without inconvenience to the user.

A further object of the invention is to provide a device of the character stated consisting of two different sized concentric hoops rigidly fastened together in spaced relation by a front and rear upright, the lower end of the rear upright being bent so as to project rearwardly and act as a support for holding the lower portion of the device away from the object to which it is fastened by means of the handle, said handle consisting of side rails rigidly secured to the larger or upper hoop and projecting rearwardly therefrom and having the wooden handle mounted therebetween.

With these ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application, in which:—

Figure 3:
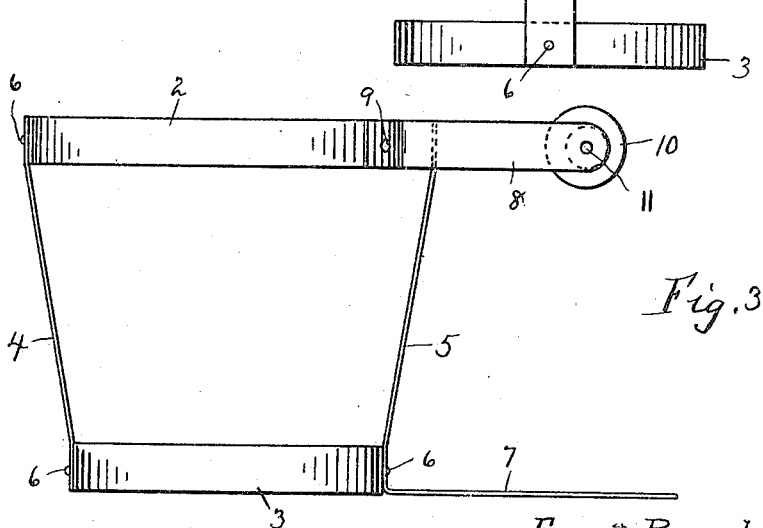
Fig. 3, is a side elevation thereof.

In carrying out my invention as here embodied, 2 and 3 represent two hoops. The latter being of smaller diameter than the former is used as the lower hoop and these two hoops are secured together in spaced relation by means of front and rear uprights 4 and 5, said uprights being formed from relatively thin strips of metal and diverging from the lower or smaller hoop toward the upper or larger hoop as plainly shown in Fig. 3.

These uprights are rigidly secured to the different hoops in some suitable manner as by rivets 6, the lower end of the rear upright 5 projecting rearwardly to form a support 7, the same forming an integral part of the rear upright 5 at approximately right angles of said upright or in the same plane as the lower edge of the lower hoop 3.

Figure 1:
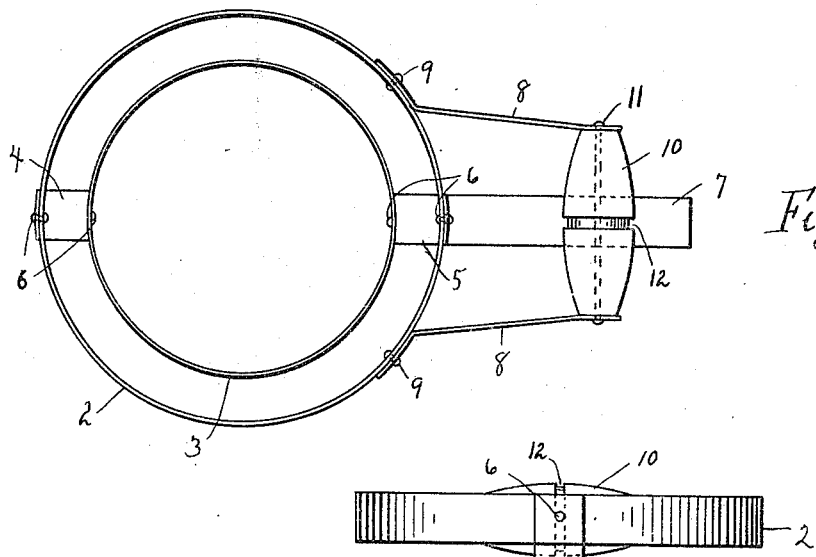
Figure 1, is a plan view of my improved flower pot holder and carrier.
Figure 2:
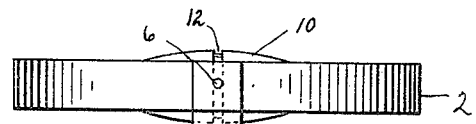
Fig. 2, is a front elevation thereof.

To the upper or larger hoop and in the rear half thereof are secured a pair of handle side rails 8 which are formed from relatively thin strips, the same as the other parts of the device and these handle side rails project rearwardly with their edges in the same plane as the edges of the upper hoop and their outer ends converging, as plainly shown in Fig. 1.

The inner ends of the handle side rails are rigidly fastened to the upper hoop by suitable fastening means such as rivets 9 and between their outer ends is located a wooden handle 10 held in place by a bar 11 which passes through said handle and the handle side rails and has its ends headed as illustrated in Fig. 1.

The handle 10 preferably tapers from the center toward its ends in order to produce a convenient hand hold and midway between its ends is formed an annular groove 12 adapted to engage a hook or other suitable supporting means when the device is being used as a hanging basket.

From the foregoing description it will be obvious that the device above described may be used as a carrier for a flower pot or other similar receptacle and by taking hold of the handle 10, the pot and its plant may be readily transported from place to place without the person taking hold of the pot itself thus preventing the hands of the person from becoming soiled. Further by carrying a potted plant in this manner the same may be held a sufficient distance from the person to prevent the plant from being injured or broken.

When the device is to be used as a hanging basket the handle may be placed over a hook or any other suitable support, while the rearwardly projecting extension or support 7 will engage the exterior face of the object to which the hook or other support is fastened, thereby holding the device in an upright position so that the growing plant may extend in all directions or may hang down from the pot in which it is planted without coming in contact with any other object.

Of course I do not wish to be limited to the exact details of construction as herein shown as these may be varied within the limits of the appended claims without departing from the spirit of my invention.

Having thus fully described my invention, what I claim as new and patentable is:—

1. A flower pot holder and carrier comprising two concentric hoops of different size, connecting uprights fixed to said hoops for spacing them apart, a pair of oppositely disposed handle side rails rigidly secured to the larger hoop and projecting rearwardly therefrom in the same plane, a handle fixed between the outer ends of the handle side rails and a rearwardly projecting support formed integral with one of the uprights.

2. A flower pot holder and carrier comprising two concentric hoops of different size, a forward and rear upright rigidly secured to said hoops for spacing them apart, a rearwardly projecting support formed integral with the rear upright and lying in the same plane as the lower edge of the smaller hoop and a handle carried by the larger hoop.

3. A flower pot holder and carrier comprising two concentric hoops of different size, a forward and rear upright rigidly secured to said hoops for spacing them apart, a rearwardly projecting support formed integral with the rear upright and lying in the same plane as the lower edge of the smaller hoop, a pair of handle side rails rigidly secured to the larger hoop within the rear half of its circumference, said handle side rails projecting rearwardly in the same plane as the hoop to which they are attached with the outer ends converging, a handle located between the outer ends of said handle side rails and a rod passing through said side rails and the handle for securing the parts together.

In testimony whereof I have hereunto affixed my signature.

ERNEST BUNZEL.

Copies of this patent may be obtained for five cents each, by addressing the "Commissioner of Patents, Washington, D. C."